United States Patent Office 3,090,789
Patented May 21, 1963

3,090,789
2-AMINO-4,6-DINITROBENZOTHIAZOLE
Joseph W. Dehn, Jr., Bayside, and Roy A. Pizzarello, Mount Vernon, N.Y., and Robert Eltonhead, Englewood, N.J., assignors to Interchemical Corporation, New York, N.Y., a corporation
No Drawing. Original application Sept. 25, 1957, Ser. No. 686,046. Divided and this application Nov. 17, 1960, Ser. No. 69,795
2 Claims. (Cl. 260—305)

This invention relates to the compound 2-amino-4,6-dinitrobenzothiazole, and valuable azo dyes made therefrom.

2-amino-4,6-dinitrobenzothiazole has the following structure:

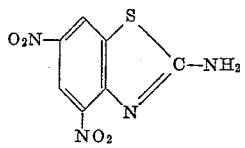

It has been now found that this compound can be prepared by nitration of 2-aminobenzothiazole or 2-amino-4-nitrobenzothiazole, which latter compound has the structure:

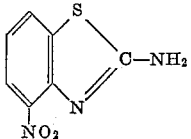

It has further been found that the 2-amino-4,6-dinitrobenzothiazole of this invention may be diazotized and coupled with any of a variety of coupling agents to produce valuable azo dyes which are especially effective in dyeing cellulose acetate, nylon and Dacron fibers.

Diazotized 2-amino-4,6-dinitrobenzothiazole can be coupled with phenols, such as phenol, cresols, naphthols, resorcinol, guaiacol, etc., to give generally yellow-to-orange dyes. It can also be coupled with "active methylene" compounds such as acetoacetanilide, 1-phenyl-3-methyl-pyrazolone, and substitution (especially halogenation) products thereof, to give also generally yellow to orange dyes.

Of special interest, however, are the azo dyestuffs preparable by coupling diazotized 2-amino-4,6-dinitrobenzothiazole with tertiary aromatic amines such as dimethyl aniline, diethylaniline, phenyl diethanolamine, m-tolyl diethanolamine, phenyl ethyl ethanolamine, N-phenyl-N-beta-cyanoethyl ethanolamine, N-(2-methoxy-5-methyl) phenyl diethanolamine, N-phenyl-N-butyl ethanol-amine, N-ethyl - N - (2,3 - dihydroxypropyl) - m-toluidine, N-(2-methoxy - 5 - acetylaminophenyl)-diethanolamine, ethyl-beta-cyanoethyl-aniline, and N-phenyl morpholine, which dyes give fast violet, blue, and green shades on cellulose acetate, Dacron and nylon.

2-amino-4,6-dinitrobenzothiazole can be prepared by nitration of 2-aminobenzothiazole or 2-amino-4-nitrobenzothiazole. The following Examples 1 and 2 illustrate the preparation of this new and valuable intermediate.

EXAMPLE 1

Nitration of 2-Amino-4-Nitrobenzothiazole

Thirty-nine grams of 2-amino-4-nitrobenzothiazole is dissolved in 400 ml. of 96% sulfuric acid, the solution is cooled to 3–5° C. and then, over a period of twenty minutes, a mixture of 18 grams of 70% nitric acid with 200 ml. of 96% sulfuric acid is added with stirring. After addition of the nitration mixture is complete, the reaction is stirred for one hour at 0° C. and then the temperature is allowed to rise, over a period of two hours, to 19° C. Stirring is continued throughout this two hour interval and for an additional one and one-half hours, during which the temperature is raised to 99° C. during the first hour and then maintained at 99° C. for one-half hour. After cooling overnight the reaction mixture is added slowly to enough of an ice-water mixture to make a final volume of 8000 ml. The lemon yellow precipitate is collected by filtration and washed with water until neutral to litmus. It is then suspended in dilute aqueous sodium bicarbonate solution (16.8 grams of sodium bicarbonate in 1500 ml. water) and then filtered and washed neutral to litmus. It is then dried at 50° C. to give 45 grams (93.8% of theory) of product which melts at 334–337° C. with decomposition. An elemental-analysis shows 23.22% nitrogen, 35.26% carbon, 1.83% hydrogen and 13.77% sulfur (calculated for dinitro 2-amino benzothiazole: 23.35% nitrogen, 35.00% carbon, 1.67% hydrogen and 13.33% sulfur).

2-amino-4-nitro-benzothiazole used in the above preparation is obtained by the following series of reactions in accordance with prior art teachings:

(1)
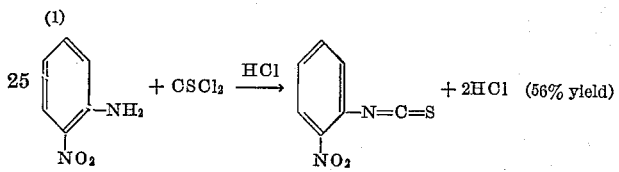

(2)
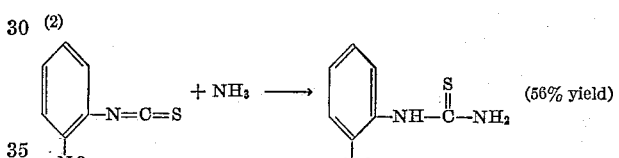

(3)
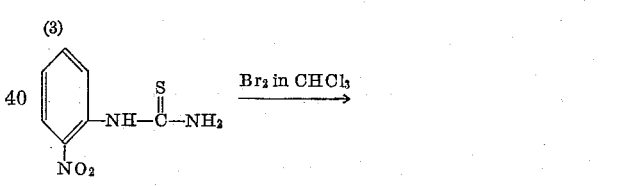

(4)
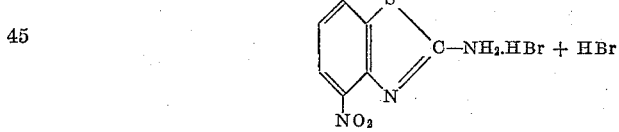

The yield of 2-amino-4-nitro-benzothiazole is 70%, based on the amount of o-nitrophenylthiourea used in reaction number 3.

EXAMPLE 2

Nitration of 2-Aminobenzothiazole

Into a five-liter, three-neck flask fitted with a mechanical stirrer, a thermometer, and a dropping funnel is placed 1500 ml. of concentrated (96%) sulfuric acid which is then cooled with stirring to below 10° C. While keeping the temperature below 10° C., 150 g. of 2-aminobenzothiazole is added gradually. After the 2-aminobenzothiazole has all dissolved, 1240 g. of mixed acid (made from 140 g. of 90% nitric acid and 1100 g. of 20% oleum) are added while keeping the temperature below 5° C. Stirring is continued for one hour at 0–5° C., and then at room temperature overnight. The mixture is then heated to 100° C. and stirred for three hours at this temperature, after which it is cooled to 25° C., and poured into ice and water contained in a 30-liter battery jar. The product precipitates as a bright yellow powder which is filtered, washed free of acid, and dried over night at 50° C. The product melts with decomposition at 320–325° C., with some preliminary shrinking at 300° C. Elementary analysis shows 22.84% N; calculated for $C_7H_4O_4N_4S$, 23.35.

Ten grams of the above crude 2-amino-4,6-dinitrobenzothiazole are purified by four recrystallizations from 600 ml. of nitrobenzene. In this way, 5.64 grams of yellow solid is obtained which contains 23.13% N, melts at 331–334° C., and shows no melting point depression when mixed with the product of Example 1.

As above pointed out, the 2-amino-4,6-dinitrobenzothiazole of this invention can be employed as a chemical intermediate and is especially useful in the preparation of azo dyestuffs. Examples 3–14 illustrate the preparation of such novel dyes.

EXAMPLE 3

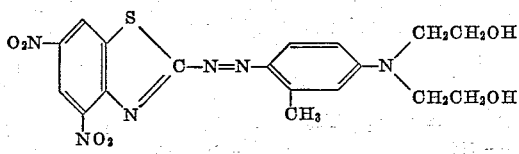

*Diazotization.*—A solution of 4.80 g. of 2-amino-4,6-dinitrobenzothiazole in 50 ml. of 85% phosphoric acid is placed in a 250 ml. three-neck flask and cooled with stirring in an ice-salt bath to between −15 and −12° C. While keeping the temperature within these limits, 1.52 g. of sodium nitrite dissolved in 5 ml. of water is added over a period of 20 minutes, after which the mixture is stirred for an additional 75 minutes at about −13° C.

*Coupling.*—m-Tolyl diethanolamine (3.90 g.) is dissolved in 150 ml. of water and 2 ml. of 37% hydrochloric acid contained in an 800 ml. beaker. The above diazotized 2-amino-4,6-dinitrobenzothiazole solution is now added over a ten-minute period with vigorous stirring. The temperature of the reaction mixture is kept between −4° C. and 0° C. by addition of ice. A deep blue precipitate forms, and the mixture is stirred for another 30 minutes, keeping the temperature below 5° C. A solution of 60.5 g. of sodium acetate in 200 ml. of water is then added slowly, keeping the temperature below 13° C. At this stage, the mixture tests gray, i.e., is neutral, to Congo red. It is stirred for three hours longer, and filtered. The intensely blue solid is collected, washed well with water until the washings are neutral to litmus, and dried at 50° C. A yield of 4.60 g., representing 51.9% of theoretical, is obtained. The dye may be purified by recrystallization from aqueous acetone.

*Dispersion.*—One gram of the above dye is ground with 0.50 gram of sodium lignin sulfonate (Marasperse N), 0.50 gram of Cyclopon AF, and a little water. The mixture is then dried at 50° C. and pulverized.

*Dyeing.*—The product dyes acetate, nylon, and Dacron in blue shades. The dyeings of acetate give strong blue shades with good build-up. The fastness to light, gas, sublimination, hot press, and wash (AATCC Wash Test #3) are good. The dyeings are dischargeable.

EXAMPLE 4

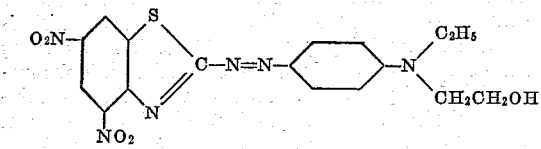

Diazotization is conducted in the same manner as described in Example 3.

*Coupling.*—3.30 g. of N-ethyl-N-beta-hydroxyethylaniline, 2.0 ml. of 37% hydrochloric acid, and 150 ml. of water are stirred together in a 1-liter beaker until dissolution is complete. The diazonium solution is then added with vigorous stirring over a period of 10 minutes, the temperature being maintained at 0° C. by addition of ice as necessary. A blue precipitate is formed. The suspension is stirred for 45 minutes at 0–5° C. Then a solution of 60.5 g. of sodium acetate in 200 ml. of water is added over a period of 10 minutes, the temperature being maintained between 5 and 14° C. The liquid is neutral (i.e., tests gray) to Congo red. After three additional hours of stirring at 14–18° C., the solid is filtered off, washed with water until the washings are neutral to litmus, and dried at 50° C. A yield of 5.00 g., representing 60.1% of theoretical, is obtained.

*Dispersion.*—This dye is dispersed in the same manner as in Example 3.

*Dyeing.*—This dye produces strong blue shades on acetate, nylon, and Dacron, with good build-up. The dyeings are dischargeable.

EXAMPLE 5

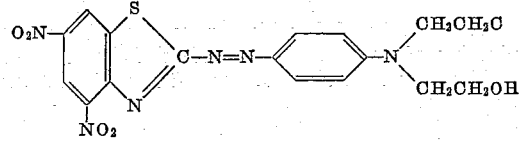

Diazotization is conducted as described for Example 3.

*Coupling.*—3.80 g. of beta-cyanoethyl-beta-hydroxyethylaniline are dissolved in 150 ml. of water and 4.0 ml. of 37% hydrochloric acid contained in a one-liter beaker. The solution is cooled to below 0° C. by addition of ice, and the diazonium solution is added gradually over a period of seven minutes, adding ice as necessary to keep the temperature below 0° C. A blue-violet precipitate forms, and the slurry is stirred for one hour with the temperature between 0 and 11° C. A solution of 68.6 g. of sodium acetate in 200 ml. of water is now added slowly, which makes the solution test gray to Congo red. The slurry is stirred for an additional two hours and then filtered. The solid is washed with water until the washings are neutral to litmus, and then dried in an oven at 50° C. 5.50 g. of a blue-violet product is obtained, indicating a yield of 62.4% of theoretical.

Dispersion is effected as in Example 3.

Dyeings on nylon are reddish-blue; on Dacron, a violet color. Acetate is dyed a violet color with good build-up and good lightfastness.

EXAMPLE 6

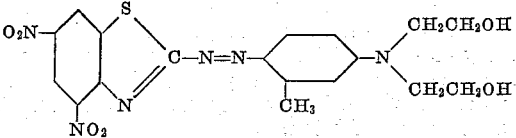

*Diazotization.*—A solution of 4.80 grams of 2-amino-4,6-dinitrobenzothiazole in 50 ml. of 85% phosphoric acid contained in a 250 ml. 3-neck flask is cooled with stirring in an ice-salt bath to −14° C. 1.40 grams of sodium nitrite is added as a solid, and stirring is continued for three hours, keeping the temperature between −17 and −10° C.

*Coupling.*—m-Tolyl diethanolamine (3.90 g.) is dissolved in a mixture of 2 ml. of 37% hydrochloric acid and 150 ml. of water contained in a 1000 ml. beaker. The solution is cooled with ice to below 0° C., and the diazotized amino-dinitrobenzothiazole is added over a period of 10 minutes with vigorous stirring, adding ice as necessary to keep the temperature below 0° C. A blue solid separates. After stirring the mixture for 45 minutes at about 0° C., the mineral acid is neutralized by addition of 60.5 g. of sodium acetate dissolved in 200 ml. of water. The neutralized mixture (testing gray to Congo red) is stirred for 2½ hours and filtered. The solid is washed neutral to litmus and dried at 50° C. A yield of 5.08 g., corresponding to 56.9% of theoretical is obtained. The product is identical in properties and behavior with that of Example 3.

EXAMPLE 7

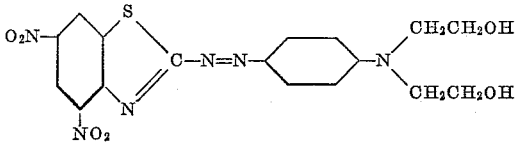

Diazotization is effected as described in Example 6.

*Coupling.*—N-phenyl-diethanolamine (3.62 g.) is dissolved in 150 ml. of water and 2.0 ml. of 37% hydrochloric acid contained in a one-liter beaker. The solution is cooled to below 0° C., and the diazonium solution is added over a period of 10 minutes, stirring vigorously and keeping the temperature below 0° C. by addition of ice as necessary. A blue precipitate forms, and the resulting suspension is stirred for 2½ hours. There is then added slowly a solution of 60.5 g. of sodium acetate in 200 ml. of water. The suspension now tests gray to Congo red. It is stirred for 23 hours at room temperature, heated briefly to 85° C., and allowed to cool to room temperature. The intensely blue solid is isolated by filtering, washing neutral to litmus, and drying at 50° C. The yield is 5.40 g., equivalent to 62% of theoretical.

Dispersion is effected as in Example 3.

*Dyeing.*—The product of this example dyed acetate, nylon and Dacron in blue shades. The dyeing on acetate is strong deep blue with good build-up and has good fastness to light, gas and sublimation. The dyeings are dischargeable.

EXAMPLE 8

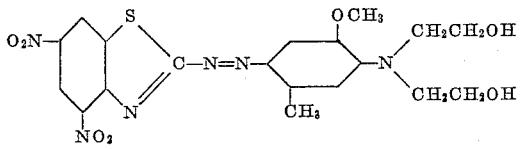

Diazotization is effected as in Example 6.

*Coupling.*—N,N-di-(beta-hydroxyethyl)-cresidine (4.50 g.) is dissolved in 150 ml. of water and 2.0 ml. of 37% hydrochloric acid contained in one-liter beaker, and the solution is cooled to below 0° C. by addition of ice. The diazonium solution is now added gradually over a period of 10 minutes, the reaction mixture being stirred vigorously and kept at a temperature below 0° C. by addition of ice as necessary. A green-blue precipitate forms, and the slurry is stirred for two hours at 0–14° C. There is then added, with good stirring, a solution of 60.5 g. of sodium acetate in 200 ml. of water, which neutralizes the mineral acid. The reaction mixture is then stirred for twenty hours at room temperature, after which the dye is isolated by filtering, washing neutral to litmus, and drying in an oven at 50° C. The product weighs 5.00 grams, indicating a yield of 52.8% of theoretical.

Dispersion is effected as in Example 3.

*Dyeing.*—The product dyes acetate, nylon and Dacron in gray-blue shades.

EXAMPLE 9

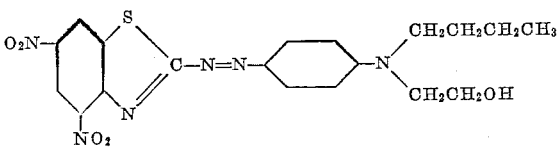

Diazotization is effected as described in Example 6.

*Coupling.*—N-butyl-N-phenyl ethanolamine (3.86 g.) is dissolved in 150 ml. of water and 2.0 ml. of 37% hydrochloric acid contained in a one-liter beaker. The mixture is cooled to 0° C. by addition of ice, and the diazonium solution is then added gradually, with good stirring, over a period of 20 minutes, adding ice as necessary to keep the temperature below 2° C. A blue-green precipitate is formed, and the mixture is stirred for one hour with the temperature between 0° C. and 14° C. The mineral acid is then neutralized by gradually adding a solution consisting of 60.5 g. of sodium acetate in 2000 ml. of water. The mixture now tests gray to Congo red. Stirring is continued for 18 hours at room temperature, after which the dyestuff is collected by filtration, washed neutral to litmus, and dried at 50° C. The yield is 4.56 g., equivalent to 51.4% of theory.

Dispersion of this dye is effected as described in Example 3.

*Dyeing.*—This dye produces a blue shade on acetate and Dacron and a gray-green shade on nylon.

EXAMPLE 10

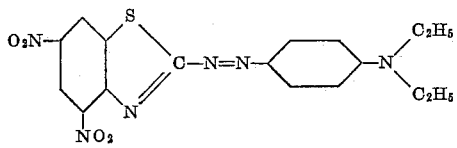

*Diazotization.*—2-amino-4,6-dinitrobenzothiazole (4.80 g.) is pulverized and dissolved in 50 ml. of 85% phosphoric acid contained in a 250 ml. three-neck flask equipped with thermometer and mechanical stirrer. The mixture is cooled in an ice-salt bath, and nitrosyl sulfuric acid, prepared by dissolving 1.40 g. of sodium nitrite in 15.0 ml. of 96% sulfuric acid, is added over a period of 10 minutes during which time the temperature of the reaction mixture is kept between —14° C. and —9° C. Stirring is continued at —10° C. for 4 hours, and then 30 ml. of water is added dropwise, keeping the mixture at below —10° C., and the mixture is then stirred for an additional 1½ hours at —10° C.

*Coupling.*—Diethyl aniline (2.98 g.) is dissolved in 150 ml. of water and 2.0 ml. of 37% hydrochloric acid contained in a 1.5 liter beaker. The diazonium solution, prepared as above described, is added over a period of five minutes, adding ice as necessary to keep the reaction mixture at 0° C. A green precipitate forms, and the resulting slurry is stirred for 18 hours. The mineral acid is neutralized by gradual addition of a solution of 105.2 grams of sodium acetate in 500 ml. of water; after this treatment, the mixture tests gray to Congo red. After stirring for another hour or so, the solid dyestuff is collected by filtering, washing with water until neutral to litmus, and drying at 50° C. A yield of 4.70 grams, equivalent to 58.8% of theoretical, is obtained.

Dispersion is effected as described in Example 3.

*Dyeing.*—The product of this example colored acetate and Dacron in blue shades and nylon in a green shade.

EXAMPLE 11

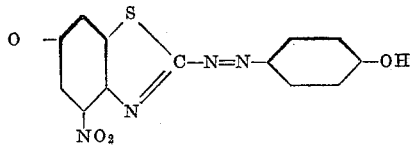

Diazotization is effected as described in Example 3.

*Coupling.*—Phenol (1.88 g.) is dissolved in 50 ml. of 0.5 N methanolic sodium hydroxide, and this solution is added dropwise, over a 25 minute period, to the vigorously stirred diazonium solution which is maintained at a temperature between —16° C. and —8° C. by means of an ice-salt mixture. An orange precipitate forms. The reaction mixture is stirred for one hour at sub-zero temperatures maintained by an ice-salt bath, and then for another hour at ice-bath temperature. It is then poured into 500 ml. of ice and water and stirred for a short time. The precipitate is filtered, washed neutral to litmus, and dried in a vacuum desiccator. The yield is 4.84 g. of orange solid, equivalent to 70.0% of theoretical.

Dispersion is effected as described in Example 3.

*Dyeing.*—The product of this example dyes acetate and Dacron in gold shades.

EXAMPLE 12

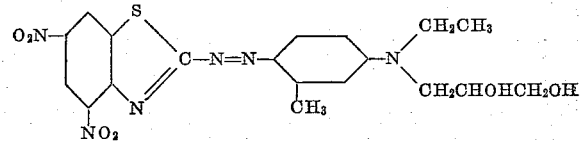

Diazotization is effected as described in Example 6.

*Coupling.*—N-ethyl-N-(2,3 - dihydroxypropyl)-m-toluidine (4.18 g.) is dissolved in 2 ml. of 37% hydrochloric acid and 150 ml. of water. The solution is cooled to 0° C. by adding ice, and the diazonium solution is then added with stirring over a period of 10 minutes, adding ice as necessary to keep the mixture at about 0° C. A blue precipitate forms, and the mixture is stirred for ½ hour, keeping the temperature between 0 and 15° C. Then a solution of 60.5 g. of sodium acetate in 200 ml. of water is added to neutralize the mineral acids.

The reaction mixture (testing gray to Congo red) is stirred over night at room temperature and filtered. The blue solid is washed with water until neutral to litmus, and then dried at 60° C. The yield is 4.95 g., corresponding to 53.8% of theoretical.

Dispersion is effected as in Example 3.

*Dyeing.*—The product dyes acetate, nylon and Dacron in blue shades. The dyeings are dischargeable. The dyeings on acetate exhibit good fastness to gas, light, sublimation, and washing.

EXAMPLE 13

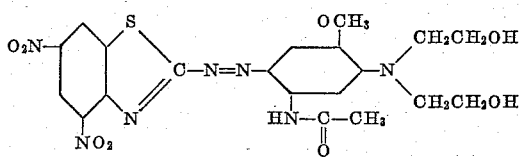

Diazotization is effected as described in Example 3.

*Coupling.*—2-(N,N - di - beta-hydroxyethyl) amino-4-acetylaminoanisole (5.36 g.) is dissolved in a mixture of 2.0 ml. of 37% hydrochloric acid and 64 ml. of water. The solution is cooled to about 0° C. by addition of ice, and the diazonium solution is added slowly over a period of 10 minutes, maintaining the reaction mixture at 0° C. by suitable additions of ice. A slate-blue precipitate forms. After stirring for one hour at about 0° C., the mixture is neutralized to Congo red by addition of sodium acetate solution. After another two hours of stirring, the product is isolated by filtering, washing neutral to litmus, and drying at 50° C. The yield is 4.9 g., corresponding to 47.2% of theoretical.

Dispersion is effected as in Example 3.

*Dyeing.*—The product dyes acetate a grayish-green and yields gray shades on Dacron and nylon.

EXAMPLE 14

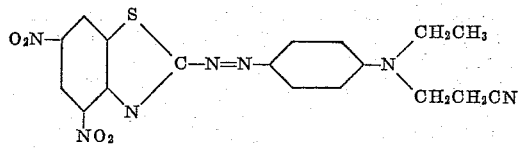

Diazotization is effected as described in Example 6.

*Coupling.*—N-ethyl-N-beta-cyanoethyl aniline (3.48 g.) is dissolved in 2 ml. of 37% hydrochloric acid and 150 ml. of water. The solution is cooled to about 0° C. by addition of ice, and the diazonium solution is added with good stirring over a period of 10 minutes, keeping the temperature of the mixture at about 0° C., by addition of ice as needed; a very dark violet precipitate forms. The mixture is stirred for two hours, neutralized with sodium acetate, and stirred over night. By filtering, washing neutral, and drying at 50° C., there is obtained 5.02 grams of product, corresponding to a yield of 59.2% of theoretical.

Dispersion is effected as described in Example 3.

*Dyeing.*—The product dyes acetate a violet shade, Dacron a reddish-violet shade, and nylon a gray-violet shade. The dyeings on acetate are dischargeable and show good fastness to light, gas, and sublimation.

The term "Dacron," as used in this specification, designates the ethylene glycol terephthalate linear super-polyester fiber manufactured and sold under that name by E. I. du Pont de Nemours and Co., Inc. The term "nylon," as used in this specification, designates the linear superpolyamide fibers derived from epsilon-caprolactam or from hexamethylene diamine adipate. The term "acetate" as used herein to designate textile fibers refers to fibers spun from acetylated cellulose. "Marasperse N" is a sodium lignin sulfonate distributed by the General Dyestuffs Corporation and is understood to be an N-acylation product derived from higher fatty acid chlorides (palmitic and oleic) and N-methyl taurine. It is sold as the sodium salt, and thus has the structure

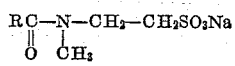

By "buildup" is meant that characteristic of a dye which permits production of pastel shades at low dye concentrations and deep shades at higher dye concentration. It has sometimes been referred to as "color strength" or "color value."

This application is a division of our copending application, Serial Number 686,046, filed September 25, 1957.

What is claimed is:

1. 2-amino-4,6-dinitro-benzothiazole.
2. The method of preparing 2-amino-4,6-dinitrobenzothiazole which comprises nitrating 2-amino-4-nitrobenzothiazole.

References Cited in the file of this patent
UNITED STATES PATENTS
2,868,775     Straley et al. _____ Jan. 13, 1959

FOREIGN PATENTS
707,599     Great Britain _____ Apr. 21, 1954

OTHER REFERENCES
Dyson et al.: Chem. Abstracts, volume 21, page 2688 (1927).

Hunter et al.: Chem. Abstracts, volume 25, page 104 (1931).